United States Patent
Foltin

(10) Patent No.: US 9,764,498 B2
(45) Date of Patent: Sep. 19, 2017

(54) PLANT AND METHOD FOR THE RECOVERY OF PLASTIC MATERIALS OF POST-CONSUMPTION MATERIALS, SUCH AS VEHICLE BUMPERS AND TANKS

(71) Applicant: Antonio Foltin, Rogeno (IT)

(72) Inventor: Antonio Foltin, Rogeno (IT)

(73) Assignee: C. & C. S.R.L., Albavilla (IT)

( * ) Notice: Subject to any disclaimer, the term of this patent is extended or adjusted under 35 U.S.C. 154(b) by 260 days.

(21) Appl. No.: 14/489,825

(22) Filed: Sep. 18, 2014

(65) Prior Publication Data

US 2015/0076258 A1    Mar. 19, 2015

(30) Foreign Application Priority Data

Sep. 19, 2013 (IT) .............................. CO2013A0039

(51) Int. Cl.

| | |
|---|---|
| B02C 23/38 | (2006.01) |
| B29B 17/04 | (2006.01) |
| B29B 17/02 | (2006.01) |
| B02C 23/08 | (2006.01) |
| B29K 105/26 | (2006.01) |
| B29L 31/30 | (2006.01) |
| B29L 31/00 | (2006.01) |

(52) U.S. Cl.
CPC .............. *B29B 17/04* (2013.01); *B02C 23/08* (2013.01); *B02C 23/38* (2013.01); *B29B 17/02* (2013.01); *B29B 17/0412* (2013.01); *B29B 2017/0268* (2013.01); *B29B 2017/0272* (2013.01); *B29B 2017/0289* (2013.01); *B29K 2105/26* (2013.01); *B29L 2031/3044* (2013.01); *B29L 2031/7172* (2013.01); *Y02W 30/526* (2015.05); *Y02W 30/622* (2015.05); *Y02W 30/625* (2015.05)

(58) Field of Classification Search
None
See application file for complete search history.

(56) References Cited

U.S. PATENT DOCUMENTS 5,566,889 A * 10/1996 Preiss ..................... B29B 17/02
241/19

FOREIGN PATENT DOCUMENTS

JP            3-175008 A  *  7/1991

* cited by examiner

*Primary Examiner* — Mark Rosenbaum
(74) *Attorney, Agent, or Firm* — Young & Thompson

(57) ABSTRACT

A plant (1) and method for recovering plastic materials of post-consumption materials, such as vehicle bumpers and tanks, in the plant, downstream of the volumetric reduction grinder (2), there is provided an intermediate grinder (6) and the washing vat (9) and the centrifuge (12) additionally being arranged upstream of the windmill/granulator (14), while in the method, an intermediate grinding step is arranged upstream of the grinding/granulation step and a subsequent washing step and separation in the vat of the parts of foreign materials through the difference of specific weight, including ferrous, non-ferrous materials and alloys thereof, of the material made of intermediate size, before the grinding/granulation step through windmill/granulator, wherein the washing and centrifugation water is subjected to a continuous purification cycle. In order to increase the productivity of the plant and reducing the maintenance times, the conveying elements for transporting the material are provided mobile, mounted on swivel wheels.

20 Claims, 2 Drawing Sheets

Figure 1:
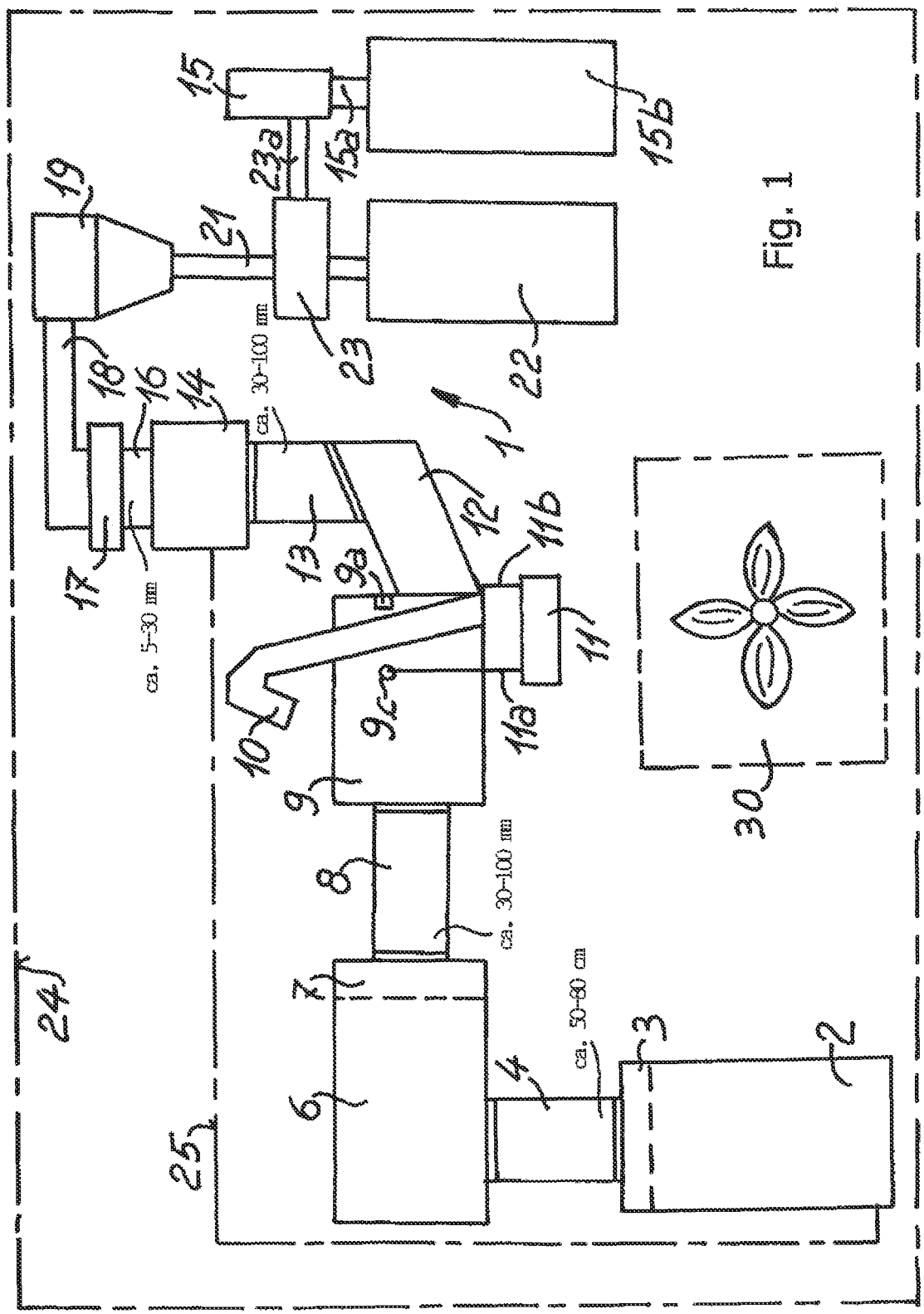

PLANT AND METHOD FOR THE RECOVERY OF PLASTIC MATERIALS OF POST-CONSUMPTION MATERIALS, SUCH AS VEHICLE BUMPERS AND TANKS

FIELD OF THE INVENTION

The present invention refers to a plant and a method for the recovery of plastic materials of post-consumption materials, such as vehicle bumpers and tanks, wherein the bumpers are made of polypropylene (PP) and high density polyethylene (HD PE) tanks, according to the preambles of claims 1 and 8.

TECHNOLOGICAL BACKGROUND AND PRIOR ART

As known, bumpers and tanks disassembled from vehicles to be demolished are conferred loose and/or crushed and compressed to form parallelepiped-like "packets", which are constrained like packaging using strapping belts and then stored outdoors, wherein during said storage the packets are thus dirtied by mud, water, sand and soil.

Furthermore it is known that disassembled bumpers and tanks still contain a plurality of ferrous metal components, steel components, cast iron components, as well as electrical cables and terminals, headlights, flat reinforcements, polystyrene, same case also applying to ducts made of various synthetic materials, such as nylon, ABS and so on and so forth, besides residues of hydrocarbons.

The recovery/recycling of polypropylene and high density polyethylene currently occurs through crushing and grinding/granulation, with possible washing step.

In a known plant, vehicle bumpers or tanks, hereinafter referred to as "the material" is initially subjected to a step of grinding in a grinder with reduction of volume and compaction, with simultaneous iron removal, forming a grain size of the ground material of about 50-80 cm. The material thus ground is then conveyed to a windmill or granulator which provides for a further breaking to a final grain size of about 10-20 mm. Then, there follows the step of suctioning for the removal of the light components, such as pieces of paper, plastic, powder and the like, before stuffing the material in silos or big bags. A plant of this type is produced, for example, by the Italian company TPA trituratori SpA in Santa Giustina in Colle (PD).

Kun Sheng Machine Co., Ltd. advertises a plant of the type in question comprising a washing step, which equally comprises an initial grinding step for the reduction of volume and compaction, with iron removal and grinding to a grain size of about 50-80 cm and subsequent grinding stage with formation of a final grain size of about 10-20 mm, also with iron removal. The plant subsequently comprises a washing vat and a drying step for the centrifugation of the vertical column type.

In the known plants, transferring the material from one processing stage to the subsequent one occurs by using driven conveyor belts, whose support structures are fixed to the floor near the structures of the grinders, windmills, washing vat and vertical centrifuge.

A characteristic of the known plants consists in a development thereof according to a straight line and in a large installation surface.

The known plants reveal various drawbacks and disadvantages due to the mode of operation and manufacture comprising the components between the operating devices which are rigidly fixed to the floor.

After the initial grinding for reducing the meterial volume and compaction, in the ground pieces of grain size of about 50-80 cm besides the iron components there are still present other ferrous, steel, cast iron, copper, brass materials, headlights glass residues, which cause considerable wear of the blades of the windmill downstream, as well as considerable wear of the grid associated to the windmill, crucial for the reduction to the final grain size of about 10-20 mm.

This considerable reduction also requires long grinding times, during which there occurs several impacts between the metal components present in the single pieces of coarse grain size up to their final grinding to the grain size of about 10-20 mm. Such frequent and repeated impacts between hard metal components, in particular the steel beads present for closing the tanks, cause quick wear and indention of the blades of the windmill thus requiring frequent and expensive sharpening or replacement of the blades. Given that the materials entering into the windmill also have strongly adherent abrasive sand sediments, also these sand sediments contribute to causing the wear of the blades of the windmill and bearings and sealing gaskets of the relative actuation shafts. The extension of the required grinding time therefore implies a corresponding increase of electrical power consumption and considerable power of the actuation motors of the windmill due to the intense grinding effort. The extended grinding time also limits the productivity of the plant.

The traversing of the washing vat occurs with the material already reduced into the final small grain size of about 10-20 mm with a high load of metal and non-metallic foreign components, also ground in the windmill.

According to the present invention, there arises the need of indicating a method and a plant capable of overcoming the drawbacks and disadvantages of the prior art, improving the quality of the product obtained with the simultaneous increase of productivity.

This task is overcome through a plant and a method having the characteristics of claims 1 and 8.

Further developments are indicated in the respective dependent claims.

The method and the plant according to the invention allow obtaining numerous and important advantages. Firstly, they allow drastically reducing the wear of the blades of the intermediate grinder and of the windmill or granulator, with ensuing reduction of the maintenance times and costs and considerable increase of the plant productivity.

According to the proposed method and plant there also increases the quality of the finished product, i.e. the degree of cleanliness of the same and the removal—from the finished product—of every type of foreign or accompanying material, such as the finest metal components and the polypropylene or polyethylene "powder" mainly formed during the grinding, wherein the obtained ground/granulated product constitutes a secondary raw material, i.e. a high quality material, without impurity, homogeneous and with high mechanical characteristics.

A further advantage lies in the drastic reduction of the surface required for the installation of the plant according to the invention, considering the same production with respect to the known plants, wherein the required surface according to the invention is reduced to about ⅛ with respect to the prior art. This advantage is also reflected on the corresponding reduction of the surface required for the shed in which the plant is installed. A further advantage of the plant according to the invention lies in the fact that it allows a simple integration for the simultaneous processing, alternatively, of other products of plastic materials, such as for example bottle-holder crates, tubs, jerry cans and so on and so forth, which are without components of foreign materials or others, such as metal components, electrical cables, rubber, nylon and the like.

Still, an advantage of the proposed plant lies in the fact that in the required limited installation surface there are also required spaces for keeping the required vehicle or "spider" for unloading the "packets" of compressed tanks and bumpers, or the loose tanks and bumpers, from the truck and the loading thereof into the grinder for volumetric reduction and reduction into the initial coarse grain size of about 50-80 cm.

According to a first teaching of the invention it is proposed to avoid a fine grinding/granulation of material having a coarse grain size of, for example 50-80 cm, which causes the known considerable wear of the blades of the windmill and the relative grid due to the numerous metal and abrasive parts present on the material of coarse grain size, and requires the aforementioned long grinding times, as well as higher power of the actuation motors of the shafts of the windmill.

Thus, according to the teaching of the invention it is proposed to both reduce the grain size of the material to be introduced into the windmill/granulator, as well as performing greater cleaning of the material, still with the aim of reducing the wear of the blades and the various components of the windmill/granulator and extending the maintenance interventions.

A further solution according to the invention consists in associating to the washing of the material in a random intermediate grain size, of for example about 30-100 mm, in the same washing vat, a step for the separation of the foreign parts according to the differences of the specific weight, preferably with an ensuing intense subsequent cleaning through a centrifuge combined with a feeding screw tilted upwards through a preliminary centrifugation action in water and subsequent drying along the remaining part of the feeding screw of said centrifuge.

A further important teaching of the invention consists in providing the washing step no longer downstream of the windmill/granulator but upstream of the windmill/granulator, hence also contributing to reducing the wear of the blades and the other components mentioned above and located in the cutting chamber of the windmill, such as bearings and sealing gaskets.

An important structural solution according to the invention, also aimed at increasing productivity, considerably reducing the maintenance and/or repair intervention times, is that of providing means for connection between the single stages or operating devices, i.e. the conveyor belts and/or feeding screw, instead of being rigidly fixed to the floor performed on the swivel wheels, so as to be quickly moveable away from said stages or operating devices and then repositionable, and this advantageously rapidly through one user.

SUMMARY OF THE INVENTION

Figure 2:
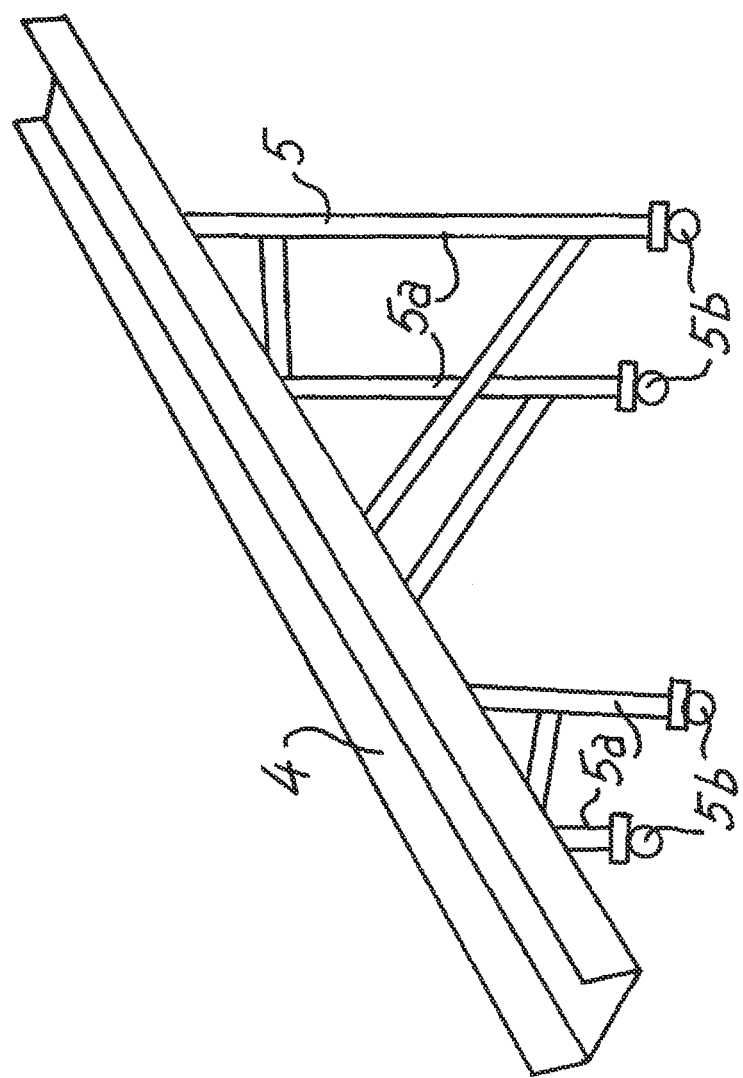

Further characteristics, advantages and details of the method and the plant according to the present invention shall be more apparent from the following description of an embodiment illustrated schematically by way of example in the attached drawings, wherein:

FIG. 1 shows the diagram of the embodiment of the plant according to the invention and for the implementation of the method according to the invention, and FIG. 2 schematically shows a means for connecting and conveying the material arranged respectively between two stages or operating devices according to the invention, in the example as a belt for conveying the material arranged between the volumetric reduction grinder and the intermediate grinder.

PREFERRED EMBODIMENT

First, reference is made to FIG. 1 for the description of the plant 1 and the method according to the invention, which can be performed with said plant 1.

The plant 1 for the recovery/recycling of plastic materials of post-consumption materials, such as bumpers and tanks of demolished vehicles according to the invention comprises a known grinder 2 for volumetric reduction and reduction in a coarse grain size, for example 50-80 cm with associated iron removal stage 3, wherein said grinder 2 is provided for example to be driven by four shafts. Indicated with 4 is a conveyor belt connecting the outlet of the volumetric reduction grinder 2 with the entry of a second grinder or intermediate grinder 6 adapted to produce a grain size of the ground material of intermediate size of, for example, 30-100 mm, wherein 7 indicates the associated stage of iron removal. The outlet of the intermediate grinder 6 is connected through a conveyor belt 8 to the inlet of a washing vat 9, in which there are supplied known additives and there also occurs, according to the invention, a separation between the polypropylene pieces, i.e. high density polyethylene, and the various components, such as metal, rubber, nylon, sand, pieces of paint and so on and so forth, through the difference of specific weight. Said foreign components are discharged outside through a pipe with an internal discharging screw 10.

A discharging screw for the median and horizontal discharge 9*a* at the rear wall of the washing vat 9 discharges the washed material into the adjacent inlet chamber underlying the combined centrifuge 12 housing a feeding screw for the upward oblique advancement and whose initial lower part is submerged in the inlet chamber in purified water with continuous cycle and whose remaining part is in an upper air drying chamber.

A conveyor belt or feeding screw 13 conveys the pieces of material still in the intermediate grain size of about 30-100 mm to a windmill/granulator 14 adapted to perform the grinding/granulation of the material in a desired final grain size of, for example, 5-30 mm. The material conveyed in the windmill 14 is dry and substantially without metal parts and abrasive sand on the single pieces of the material stream.

According to the invention the treatment water of the washing vat 9 and the water chamber of the centrifuge 12 is conveyed to a purification stage or plant 11, which is connected through the pipe 11*a* in 9*c* with the washing vat 9 and, through the pipe 11*b*, with the water chamber of the centrifuge 12.

The purification plant 11 allows constantly obtaining the washing and centrifugation water clean from impurities, such as hydrocarbon residues, soil and silica sand, paint residues, and so on and so forth, and thus drastically reduce odours and wear in the mechanical parts of the washing vat 9 and in the centrifuge 12.

The outlet 16 of the windmill 14 terminates in a stage 17 with metal detector for the removal of the possible last metal particles. 18 indicates a connection pipe between the stage of separation with metal detector 17 and a conveyor device 19 for suctioning the ground/granulated material, whose discharge pipe 21 terminates in collection and storage silos or big bags 22. Advantageously, according to the invention between the suctioning stage 19 and storage stage 22 there is arranged a pre-cleaner 23 for the removal, through an associated suctioning device 15 with internal auto-separation, from the obtained granulate product, the grinding "powder" and possible residual small light foreign particles, which are then stored in a container or silos or big bags 15*b* through a discharge pipe 15*a*.

FIG. 1 further shows with a dash and dot line 25 a conveyor belt directly connecting the volumetric reduction grinder 2 with the windmill 14 for a direct granulation operation of products made of synthetic material without components made of other materials, such as for example plastic crates for bottles, containers, etc.

For the sake of representation simplicity in the plant 1 according to the invention there are omitted various hydraulic circuits, pneumatic circuits, electrical circuits and actuation motors, in that beyond the scope of the invention and known to a man skilled in the art.

FIG. 2 schematically illustrates a device for the connection and transport of the material respectively between two devices or operation stages of the plant, and illustrates, by way of example, the conveyor belt 4. According to the invention, said conveyor belt 4 is housed in a support framework 5 provided with legs 5*a* having swivel wheels 5*b* so as to form a mobile unit easily moveable by an operator to facilitate and quicken the maintenance and/or repair operations.

The preferred embodiment and installation of the plant illustrated in FIG. 1 allows housing the entire plant 1, included the "spider" 30 for handling the bumper or tank packets, on a substantially quadrangular surface defined by the frame 24 with a dash and dot line of about 200-240 m$^2$ (e.g. about 14×14 m), for an hourly production of about 1.000-1.600 kg, i.e. corresponding to about ⅛ of the surface required by the prior art plants, considering the same production.

More in detail, as further observable from FIG. 1, the conveyor belt 4 connecting the first grinder 2 with the second grinder 6 is arranged in the longitudinal continuation of the first grinder 2 and it enters into the second grinder 6 in the transverse direction with respect to the same, while the conveyor belt 8 connecting the second grinder 6 with the washing and separation vat 9 is arranged in the longitudinal continuation of the second grinder 6, i.e. it forms an angle of about 90° with respect to the conveyor belt 4. The conveyor belt 8 enters into the washing vat 9 at a narrow side of the vat, wherein in the opposite side of said washing and separation vat 9 it is connected with the combined centrifugation stage 12, arranged tilted upwards in the longitudinal direction of the vat 9, wherein at the outlet end of the vat 12 and the inlet end in the centrifuge 12 there is provided the pipe with discharging screw 10 for the discharge of the foreign components ejected, and collected in a container on the ground, not illustrated. The upper outlet end of the centrifuge 12 is connected, vertically and with a right angle through the conveyor belt or screw 13, at the inlet of the windmill or granulator 14 arranged above. The vertical outlet 16 of the windmill 14 is connected with the overlying separation stage with a metal detector 17, in turn connected with the lateral suctioning transfer stage 19, from which the ground/granulated product mixed with the grinding powder and possible light foreign particles is conveyed to the pre-cleaner 23 to separate the ground product from the powder and light particles by suctioning. For such purpose, the pre-cleaner 23 with driven internal pre-separation is connected with a stage 15 for suctioning the light parts, whose discharge pipe 15*a* terminates in a collector or big bag 15*b*.

The method according to the invention.

With respect to the prior art, which provides for:
an initial grinding step for the volumetric reduction of the incoming material to a coarse grain-size, for example of about 50-80 cm, with associated step of separating the foreign materials by gravity and the ferrous material through iron removal,
a subsequent grinding step with reduction of the material to a small grain size of, for example 10-20 mm, with associated iron removal,
a washing step downstream of the grinding/granulation step, and
a subsequent step of drying by centrifugation and subsequent step of collecting the material in large containers or big bags, in the method according to the invention there are conceptually three characterising and inter-cooperating important suggestions for the optimal solution of the proposed task, and i.e.

there is provided for:
an intermediate grinding step for the reduction of the coarse grain-size of the material, for example of about 50-80 cm, to an intermediate grain size in the order of, for example, about 30-100 mm, with associated step of separating the foreign materials by gravity and the ferrous material through iron removal, arranged upstream of the grinding step to the small grain size of about 5-30 mm,
a subsequent step of washing in the vat, with simultaneous separation in the same vat of the parts of foreign materials through the difference of specific weight, including ferrous material, non-ferrous material and the alloys thereof, carried out on the material still made of intermediate size of about 30-100 mm, and
a step of centrifugation of the material in water and subsequent drying of said material made of intermediate size before of the grinding/granulation step in a windmill/granulator, wherein the washing and centrifugation water is purified with continuous cycle in a specific purification device or plant.

In addition, according to the invention after the grinding/granulation step there is provided for a known step of elimination of residual metal parts through the metal detector.

In addition, according to the invention, after the separation through the metal detector there is carried out a step for transferring—by suctioning—the mixture of granulate/ground material and grinding powder with possible small foreign light parts, such as made of paper, flap, polystyrene and so on and so forth, wherein said mixture is conveyed in a pre-cleaner, where there occurs a first separation of the components of said mixture inside the pre-cleaner with simultaneous dropping—by gravity—of the ground/granulated material into a collection container or big bag and picking up the grinding powder and foreign light parts from the pre-cleaner by suctioning and conveying them into a collection container or big bag.

From the above described structural and functional features of the plant and the illustrated method, it can be noticed that the method and the plant according to the invention efficiently overcome the indicated task and the mentioned advantages are attained.

In practice those skilled in the art may introduce modifications or variants, such as for example varying the value of the coarse, intermediate and small grain sizes, or subject the washing/separation vat, the centrifuge, the purification plant or other components of the plant, and so on and so forth, to modifications without departing from the scope of the invention, as described and claimed in the claims that follow.

The invention claimed is:

1. A plant (1) for the recovery of plastic materials of post-consumption products, comprising:
   a volumetric reduction grinder (2) for receiving the plastic materials and for production of a coarse grain-size material, the volumetric reduction grinder (2) having an associated iron removal stage (3),
   an intermediate grinder (6) located downstream of the volumetric reduction grinder (2), the intermediate grinder (6) receiving the coarse grain-size material from the volumetric reduction grinder (2) for an intermediate reduction to produce an intermediate grain-size material,
   a first conveyor (4) connecting said volumetric reduction grinder (2) and said intermediate grinder (6), the first conveyor (4) conveying the coarse grain-size material from the volumetric reduction grinder (2) to the intermediate grinder (6),
   a washing vat (9) located downstream of the intermediate grinder (6), the washing vat (9) using treatment water for washing the intermediate grain-size material, the washing vat comprising a centrifuge (12),
   a windmill/granulator (14) located downstream of the washing vat (9), the windmill/granulator (14) for the reduction of the intermediate grain-size material, received from the washing vat (9), to a small size plastic material, and
   a purification plant (11) for purification of the treatment water used in washing vat (9), wherein the washing vat (9) and the centrifuge (12) are fluidically associated with the purification plant (11).

2. The plant (1) according to claim 1, wherein,
   the intermediate grinder (6) has a configuration analogous to a configuration of the volumetric reduction grinder (2), and
   the intermediate grinder (6) is connected, through a second conveyor (8), with an inlet of the washing vat (9).

3. The plant (1) according to claim 2, wherein the conveyor means, including conveyor belts and augers (4, 8, 13), are obtained as mobile units on a support structure (5, 5a) thereof provided with swivel wheels (5b) and thus separable from the structures of the stages or operating devices of the plant (2, 6, 9, 12, 14).

4. The plant (1) according to claim 1, wherein,
   the washing vat (9) provides for simultaneous elimination of various components, including ferrous and non-ferrous metal, rubber, nylon, ABS, glass, and sand parts, due to different specific weight,
   said washing and separation vat has, at a lower part thereof, a pipe (10) with an auger for discharge of separated foreign components, and
   said centrifuge (12) is a centrifuge with preliminary washing in a lower water chamber and subsequent drying in an upper chamber air.

5. The plant (1) according to claim 1,
   wherein the centrifuge (12) is adapted to receive material with a grain-size between about 20 mm and about 250 mm, and
   wherein an outlet of the centrifuge (12) is connected through a connection means or screw feeder (13), with an inlet of the windmill/granulator (14) provided for the grinding/granulation of the washed and dried material and substantially without abrasive metal and adherent sand parts, of intermediate grain-size of about 30-100 mm, to a desired grain-size of about 5-30 mm.

6. The plant (1) according to claim 1, wherein, downstream of the windmill/granulator (14), there is provided a stage (17) with a metal detector which is pneumatically connected with a suctioning device (19) for the picking up and discharge of the material ground/granulated from said stage with a metal detector to a collection container or big bag (22), wherein in the path between the suctioning device (19) and the big bag (22) there is provided a pre-separator (23) of ground/granulated material and powder with light parts, the pre-separator (23) being connected to a suctioning device (15) for the picking-up and discharge of said powder and light parts from the pre-cleaner (23) in the collection big bag (15b).

7. The plant (1) according to claim 1, further comprising a conveyor belt (25) connecting the volumetric reduction grinder (2) directly with the windmill/granulator (14) for the grinding/granulation of products free of foreign components.

8. The plant of claim 1, wherein,
   the coarse grain-size material output from the volumetric reduction grinder (2) has a size of 50-80 cm,
   the intermediate grain-size material output from the intermediate grinder (3) has a size of 30-100 mm, and
   the small size plastic material output from the windmill/granulator (14) has a size of 5-30 mm.

9. The plant (1) according to claim 8, further comprising a conveyor belt (25) directly connecting the volumetric reduction grinder (2) with the windmill/granulator (14) for conveying plastic products free of foreign components to the volumetric reduction grinder (2) for direct granulation.

10. The plant (1) according to claim 1,
    further comprising a second conveyor (8),
    wherein the first conveyor (4) directly connects said volumetric reduction grinder (2) and said intermediate grinder (6), and
    wherein the intermediate grinder (6) is directly connected, through the second conveyor (8), with an inlet of the washing vat (9).

11. The plant (1) according to claim 10,
    further comprising a third conveyor (13),
    wherein the third conveyor (13) directly connects said washing vat (9) to said windmill/granulator (14).

12. The plant (1) according to claim 11,
    wherein the first conveyor (4), the second conveyor (8) and the third conveyor (13) are each mobile units on a support structure (5, 5a), each of the first conveyor (4), the second conveyor (8) and the third conveyor (13) being separable from adjacent structures of the plant (2, 6, 9, 12, 14).

13. The plant (1) according to claim 8,
    further comprising a second conveyor (8),
    wherein the first conveyor (4) directly connects said volumetric reduction grinder (2) and said intermediate grinder (6), and
    wherein the intermediate grinder (6) is directly connected, through the second conveyor (8), with an inlet of the washing vat (9).

14. The plant (1) according to claim 13,
    further comprising a third conveyor (13),
    wherein the third conveyor (13) directly connects said washing vat (9) to said windmill/granulator (14).

15. The plant (1) according to claim 14,
    wherein the first conveyor (4), the second conveyor (8) and the third conveyor (13) are each mobile units on a support structure (5, 5a), each of the first conveyor (4), the second conveyor (8) and the third conveyor (13) being separable from adjacent structures of the plant (2, 6, 9, 12, 14).

16. The plant (1) according to claim 1, further comprising a conveyor belt (25) directly connecting the volumetric reduction grinder (2) with the windmill/granulator (14) for conveying plastic products free of foreign components to the volumetric reduction grinder (2) for direct granulation.

17. A method for the recovery of plastic materials of post-consumption products, including vehicle bumpers and tanks, in a grinding/granulation plant according to claim 1, comprising:
   an initial grinding step for the volumetric reduction of the incoming material to a coarse grain-size, with an associated step of separating the foreign materials by gravity and the ferrous materials through iron removal,
   an intermediate grinding step for the reduction of the material of the coarse grain-size to an intermediate grain-size, with an associated step of separating the foreign materials by gravity and the ferrous materials through iron removal,
   a washing step of washing the material having the intermediate grain-size, wherein in the washing step includes centrifugation and wherein water used during the washing and the centrifugation is subjected to a continuous purification cycle, and
   a grinding step with reduction of the washed material having the intermediate grain-size to a material of a small grain-size with associated iron removal, and
   a step of collecting the material in silos or big bags.

18. The method according to claim 17, wherein, after the grinding step, the method further includes a step of eliminating residual metal parts through a metal detector.

19. The method according to claim 18, wherein, after the grinding step and separation through a metal detector, the method further includes
   a step of pneumatic transfer of the material with powder and light parts,
   an ensuing separation step between ground/granulated material and powder with light foreign parts with the ground/granulated material dropping, by gravity, into a collection container, and an ensuing step of pneumatic transfer of the powder with light foreign parts in a collection container thereof.

20. The method of claim 17, wherein,
the coarse grain-size is 50-80 cm,
the intermediate grain-size is 30-100 mm, and
the small size is 5-30 mm.

\* \* \* \* \*